United States Patent
Takeuchi et al.

(10) Patent No.: US 10,690,065 B2
(45) Date of Patent: Jun. 23, 2020

(54) CONTROL DEVICE OF VEHICLE

(71) Applicant: Honda Motor Co., Ltd., Tokyo (JP)

(72) Inventors: Masahiro Takeuchi, Saitama (JP);
Masaki Ueno, Saitama (JP); Hidekazu Hironobu, Saitama (JP); Masanobu Takazawa, Saitama (JP); Haruya Kitano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 15/630,961

(22) Filed: Jun. 23, 2017

(65) Prior Publication Data
US 2018/0010534 A1 Jan. 11, 2018

(30) Foreign Application Priority Data

Jul. 5, 2016 (JP) ................................ 2016-133010

(51) Int. Cl.
*F02D 41/00* (2006.01)
*F02D 11/10* (2006.01)
(Continued)

(52) U.S. Cl.
CPC ......... *F02D 41/0007* (2013.01); *B60W 20/00* (2013.01); *F02D 11/105* (2013.01);
(Continued)

(58) Field of Classification Search
CPC .. F02D 41/0007; F02D 41/1475; F02D 41/10; F02D 23/00; F02D 23/005;
(Continued)

(56) References Cited

U.S. PATENT DOCUMENTS

| | | | |
|---|---|---|---|
| 4,908,765 A | | 3/1990 | Murakami et al. |
| 5,125,235 A | * | 6/1992 | Yanagihara ............. F02D 23/02 |
| | | | 123/492 |

(Continued)

FOREIGN PATENT DOCUMENTS

| | | |
|---|---|---|
| CN | 1820136 | 8/2006 |
| CN | 102094719 | 6/2011 |

(Continued)

OTHER PUBLICATIONS

"Office Action of Japan Counterpart Application", dated Sep. 3, 2019, with English translation thereof, p. 1-p. 4.
(Continued)

*Primary Examiner* — Mark A Laurenzi
*Assistant Examiner* — Mickey H France
(74) *Attorney, Agent, or Firm* — JCIPRNET (57) ABSTRACT

A control device of a vehicle capable of improving acceleration responsiveness and suppressing increase in the NOx emission amount when a required torque is increased during a steady lean operation. A target air-fuel ratio (AFCMD) is set according to an accelerator pedal operation of a driver. When the driver depresses an accelerator pedal to make an acceleration request during the lean operation, in which the AFCMD is set to a predetermined lean air-fuel ratio (AFLN), air-fuel ratio reduction control is executed to reduce the AFCMD according to the acceleration request. In the air-fuel ratio reduction control, when the AFCMD calculated according to a required torque (TRQCMD) is smaller than a limit air-fuel ratio (AFLMT), the AFCMD is set to the AFLMT, and the AFLMT is set to a value smaller than the AFLN set in a steady state of the lean operation and larger than a theoretical air-fuel ratio (AFST).

8 Claims, 5 Drawing Sheets

(51) Int. Cl.
*B60W 20/00* (2016.01)
*F02D 41/10* (2006.01)
*F02D 29/02* (2006.01)
*F02D 23/00* (2006.01)
*F02D 41/14* (2006.01)
*F02B 37/12* (2006.01)

(52) U.S. Cl.
CPC ............ *F02D 23/00* (2013.01); *F02D 29/02* (2013.01); *F02D 41/10* (2013.01); *F02B 37/12* (2013.01); *F02D 41/1475* (2013.01); *F02D 2250/36* (2013.01); *Y02T 10/144* (2013.01)

(58) Field of Classification Search
CPC .......... F02D 23/02; F02D 43/00; F02D 43/02; F02D 43/04; F02D 11/105; F02D 2200/602; F02D 2250/36; F02B 37/12; B60W 20/00
USPC ...... 60/598, 601, 603, 605.2, 607, 608, 611, 60/273, 276, 280, 282, 28, 5, 286, 294, 60/299; 123/528, 559.1, 344
See application file for complete search history.

(56) References Cited

U.S. PATENT DOCUMENTS

| | | | |
|---|---|---|---|
| 6,279,551 B1* | 8/2001 | Iwano | F02B 37/18 123/564 |
| 6,570,265 B1* | 5/2003 | Shiraishi | B60K 6/26 290/40 C |
| 9,523,317 B1* | 12/2016 | Li | F02D 41/0042 |
| 10,273,898 B2* | 4/2019 | Sugihira | F02D 41/10 |
| 10,408,141 B2* | 9/2019 | Hotta | F02D 41/0235 |
| 2002/0013653 A1* | 1/2002 | Ohyama | F01L 13/0036 701/103 |
| 2003/0029163 A1* | 2/2003 | Tamura | F01N 3/2006 60/285 |
| 2003/0089337 A1* | 5/2003 | Cohn | F02B 1/12 123/435 |
| 2004/0016419 A1* | 1/2004 | Satou | F02D 11/105 123/492 |
| 2004/0149272 A1* | 8/2004 | Kurtz | F02B 1/12 123/568.21 |
| 2004/0149274 A1* | 8/2004 | Kurtz | F02D 41/405 123/672 |
| 2005/0022512 A1* | 2/2005 | Shirakawa | F01N 3/0814 60/285 |
| 2008/0154485 A1* | 6/2008 | Yasuda | F01N 3/101 701/113 |
| 2008/0294325 A1* | 11/2008 | Kurotani | F02B 1/08 701/102 |
| 2010/0242899 A1 | 9/2010 | Hitomi et al. | |
| 2011/0301826 A1* | 12/2011 | Galindo | F01N 3/0814 701/103 |
| 2013/0184969 A1* | 7/2013 | Rollinger | F02D 41/22 701/103 |
| 2015/0167578 A1* | 6/2015 | Hotta | F02D 41/3035 701/104 |
| 2015/0361927 A1* | 12/2015 | Glugla | F02B 47/08 60/603 |
| 2016/0032851 A1* | 2/2016 | Idogawa | F02D 41/263 701/102 |
| 2016/0090929 A1* | 3/2016 | Tanaka | F02D 21/08 123/406.52 |
| 2016/0115892 A1* | 4/2016 | Tanaka | F02P 9/002 123/406.46 |
| 2016/0123252 A1* | 5/2016 | Yoshizaki | F02D 41/107 123/436 |
| 2016/0153373 A1* | 6/2016 | Yoshizaki | F02D 41/0052 123/406.48 |
| 2016/0348606 A1* | 12/2016 | Suzuki | F02D 41/3094 |
| 2017/0074204 A1* | 3/2017 | Takamiya | F02B 37/183 |
| 2017/0113690 A1* | 4/2017 | Kim | B60W 10/06 |
| 2017/0342926 A1* | 11/2017 | Sugihira | F02D 41/10 |
| 2018/0187583 A1* | 7/2018 | De Smet | B60W 10/30 |

FOREIGN PATENT DOCUMENTS

| | | |
|---|---|---|
| CN | 102667116 | 9/2012 |
| JP | H04311640 | 11/1992 |
| JP | H05321804 | 12/1993 |
| JP | H07158462 | 6/1995 |
| JP | 2687654 | 12/1997 |
| JP | H10246132 | 9/1998 |
| JP | 2016113933 | 6/2016 |
| WO | 9956011 | 11/1999 |

OTHER PUBLICATIONS

"Office Action of China Counterpart Application," with machine English translation thereof, dated Jan. 6, 2020, p. 1-p. 10.

* cited by examiner

CONTROL DEVICE OF VEHICLE

CROSS-REFERENCE TO RELATED APPLICATION

This application claims the priority benefit of Japan application serial no. 2016-133010, filed on Jul. 5, 2016. The entirety of the above-mentioned patent application is hereby incorporated by reference herein and made a part of this specification.

BACKGROUND OF THE INVENTION

Field of the Invention

The invention relates to a control device of a vehicle that includes an internal combustion engine as the motor, and more particularly relates to a control device for controlling an internal combustion engine that includes a supercharger and performs supercharging during a lean operation, in which an air-fuel ratio of an air-fuel mixture is set to a lean side of a theoretical air-fuel ratio.

Description of Related Art

Patent Literature 1 has disclosed an exhaust gas purification device of an internal combustion engine, which includes a lean NOx catalyst in the exhaust system. According to this device, when it is determined to be in a predetermined acceleration state where the torque required by the internal combustion engine is relatively large, control is performed to set the target air-fuel ratio to a relatively rich region (the air-fuel ratio is about 16 to 19) in the lean side region of the theoretical air-fuel ratio and perform exhaust gas recirculation. As a result, when acceleration is requested during the lean operation, the air-fuel ratio is set to the relatively rich region in the lean side region to meet the acceleration request and exhaust gas recirculation is performed, so as to increase the HC amount in the exhaust gas, maintain a favorable NOx purification rate with the lean NOx catalyst, and prevent an increase in the NOx emission amount due to change of the air-fuel ratio.

PRIOR ART LITERATURE

Patent Literature

Patent Literature 1: Japanese Patent Publication No. 2687654

SUMMARY OF THE INVENTION

Problem to be Solved

In terms of the control disclosed in Patent Literature 1, exhaust gas recirculation is performed in the predetermined acceleration state, by which reduction of the NOx in the lean NOx catalyst is promoted to suppress the amount of NOx emission. However, performing the exhaust gas recirculation may cause the combustion efficiency to drop (worsen fuel consumption). Moreover, if the required torque is increased during the lean operation of an internal combustion engine equipped with a supercharger, control is performed to raise the target supercharging pressure to increase the intake air amount. However, because the increase of the intake air amount is delayed by the delay in supercharging, the responsiveness (acceleration responsiveness) of the engine output torque tends to be insufficient.

In view of the above, the invention provides a control device of a vehicle, which is capable of improving acceleration responsiveness and suppressing an increase in the NOx emission amount when the required torque is increased during the steady lean operation.

Solution to the Problem

In view of the above, the invention provides a control device of a vehicle that s drivable by an internal combustion engine (1) having a supercharger (12). The internal combustion engine is capable of executing a lean operation, in which an air-fuel ratio (AF) of an air-fuel mixture that burns in the internal combustion engine is set to a lean side of a theoretical air-fuel ratio (AFST), and a lean supercharging operation, in which supercharging is performed by the supercharger during the lean operation. The control device of the vehicle includes: a required torque setting unit setting a required torque (TRQCMD) of the internal combustion engine based on a request of a driver; a target air-fuel ratio setting unit setting a target air-fuel ratio (AFCMD) of the air-fuel mixture based on the required torque (TRQCMD); and a fuel supply unit supplying a fuel to the internal combustion engine based on the target air-fuel ratio (AFCMD). When the driver makes an acceleration request during execution of the lean operation, the target air-fuel ratio setting unit executes an air-fuel ratio reduction control to reduce the target air-fuel ratio (AFCMD) according to the acceleration request, and when the target air-fuel ratio (AFCMD) is smaller than a limit air-fuel ratio (AFLMT) in the air-fuel ratio reduction control, the target air-fuel ratio setting unit corrects the target air-fuel ratio (AFCMD) to the limit air-fuel ratio (AFLMT). The limit air-fuel ratio (AFLMT) is set to a value smaller than a steady lean operation air-fuel ratio (AFLN) set in a steady state of the lean operation and larger than the theoretical air-fuel ratio (AFST).

According to this configuration, the required torque is set based on a request of the driver of the vehicle, and the target air-fuel ratio is set based on the required torque and fuel is supplied to the internal combustion engine based on the target air-fuel ratio. When the driver makes an acceleration request during execution of the lean operation, in which the air-fuel ratio is set to the lean side of the theoretical air-fuel ratio, the air-fuel ratio reduction control that reduces the target air-fuel ratio according to the acceleration request is performed. In the air-fuel ratio reduction control, when the target air-fuel ratio is smaller than the limit air-fuel ratio, the target air-fuel ratio is corrected to the limit air-fuel ratio, and the limit air-fuel ratio is set to a value that is smaller than a steady lean operation air-fuel ratio set in the steady state of the lean operation and larger than the theoretical air-fuel ratio. As disclosed in Patent Literature 1, if the target air-fuel ratio is set to a lean air-fuel ratio of about 16 to 19, the NOx amount (feed NOx amount) discharged from the combustion chamber or the NOx concentration in the exhaust gas on the downstream side of the exhaust gas purification catalyst disposed in the exhaust system increases. Therefore, by setting the limit air-fuel ratio to about 25, for example, the NOx emission amount can be suppressed and the acceleration responsiveness can be improved at the time of acceleration in the lean operation.

According to the invention, in the control device of the vehicle described above, the limit air-fuel ratio (AFLMT) is set to a minimum value (e.g., "25"), at which an NOx concentration contained in an exhaust gas discharged from a combustion chamber of the internal combustion engine is equal to or lower than an allowable limit (CNOxLMT).

According to this configuration, the limit air-fuel ratio is set to the minimum value, at which the NOx concentration contained in the exhaust gas discharged from the combustion chamber is equal to or lower than the allowable limit. Thus, it is possible to avoid setting the target air-fuel ratio to a value between the theoretical air-fuel ratio and the limit air-fuel ratio, that is, a value in the range that increases the NOx concentration in the exhaust gas, and the NOx concentration in the exhaust gas can be kept equal to or lower than the allowable limit.

According to the invention, in the control device of the vehicle described above, the target air-fuel ratio setting unit changes the target air-fuel ratio (AFCMD) to the theoretical air-fuel ratio (AFST) when determining that an output torque (TRQA) of the internal combustion engine does not match the required torque (TRQCMD) even with execution of the air-fuel ratio reduction control.

According to this configuration, when it is determined that the output torque of the internal combustion engine cannot match the required torque even with execution of the air-fuel ratio reduction control, that is, when the required torque has a relatively large increase speed and/or increase amount and the required torque cannot be achieved through the air-fuel ratio reduction control, the target air-fuel ratio is changed to the theoretical air-fuel ratio. Thus, it is possible to avoid the air-fuel ratio range where the NOx emission amount increases and make the output torque of the internal combustion engine match the required torque.

According to the invention, in the control device of the vehicle described above, the vehicle is drivable by the internal combustion engine (1) and an electric motor (61), and further includes an electric motor control unit (30, 62) that controls the electric motor (61). The electric motor control unit controls the electric motor (61) so as to increase an output torque (TRQMOT) of the electric motor (61) by a difference (DTRQLN) between the output torque (TRQAE) of the internal combustion engine and the required torque (TRQCMD) when the target air-fuel ratio (AFCMD) has been corrected to the limit air-fuel ratio (AFLMT).

According to this configuration, when the target air-fuel ratio has been corrected to the limit air-fuel ratio, the electric motor is controlled so as to increase the electric motor output torque by the difference between the output torque of the internal combustion engine and the required torque. Thus, it is possible to suppress the NOx emission amount as well as compensate the insufficiency of the internal combustion engine output torque with the electric motor output torque.

DESCRIPTION OF THE EMBODIMENTS

Embodiments of the invention are described hereinafter with reference to the figures.

First Embodiment

Figure 1:
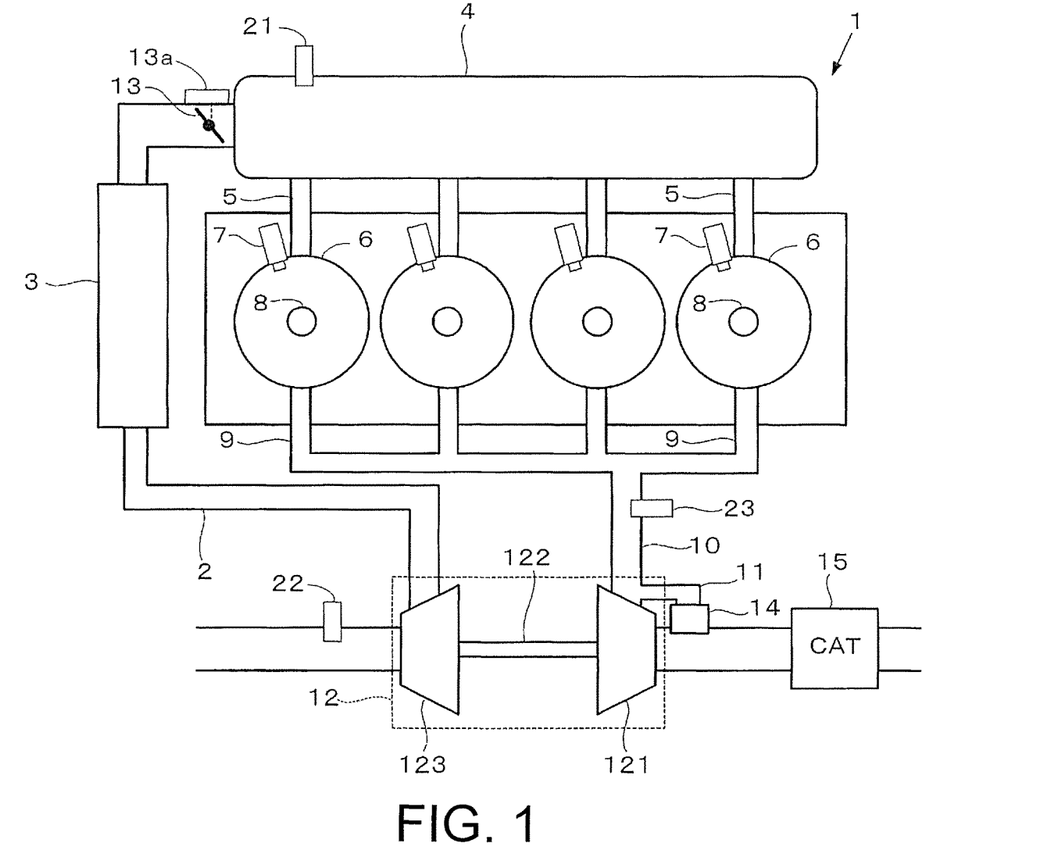
FIG. 1 is a diagram schematically showing the configuration of a direct injection internal combustion engine for driving a vehicle according to an embodiment of the invention.

FIG. 1 is a diagram schematically showing the configuration of a direct injection internal combustion engine for driving a vehicle according to an embodiment of the invention. The vehicle of the present embodiment includes only the internal combustion engine shown in FIG. 1 as the motor. The internal combustion engine (referred to as "engine" hereinafter) 1 has four cylinders 6, and each of the cylinders 6 is provided with an injector 7 and a spark plug 8. The injector 7 injects fuel directly into a combustion chamber of the cylinder 6.

The engine 1 includes an intake passage 2, an exhaust passage 10, and a turbocharger (supercharger) 12. The intake passage 2 is connected to a surge tank 4, and the surge tank 4 is connected to the combustion chamber of each of the cylinders 6 via an intake manifold 5. The intake passage 2 is provided with an intercooler 3 for cooling pressurized air and a throttle valve 13, and the throttle valve 13 is configured to be driven by a throttle actuator 13a. An intake pressure sensor 21 that detects an intake pressure PB is disposed in the surge tank 4 and an intake air amount sensor 22 that detects an intake air amount GAIR is disposed in the intake passage 2. In addition, an air-fuel ratio sensor 23, which detects an air-fuel ratio AF of an air-fuel mixture that burns in the combustion chamber by detecting an oxygen concentration in an exhaust gas, is disposed in the exhaust passage 10.

The turbocharger 12 includes a turbine 121 and a compressor 123. The turbine 121 is disposed in the exhaust passage 10 to be rotatably driven by kinetic energy of the exhaust gas, and the compressor 123 is connected to the turbine 121 via a shaft 122. The compressor 123 is disposed in the intake passage 2 and pressurizes (compresses) the air sucked into the engine 1.

The combustion chamber of each of the cylinders 6 of the engine 1 is connected to the exhaust passage 10 via an exhaust manifold 9. A bypass passage 11 that bypasses the turbine 121 is connected to the exhaust passage 10 and a waste gate valve (WG valve) 14 that controls a flow rate of the exhaust gas passing through the bypass passage 11 is disposed in the bypass passage 11. An exhaust gas purification catalyst (e.g., a three-way catalyst) 15 is further disposed in the exhaust passage 10.

Figure 2:
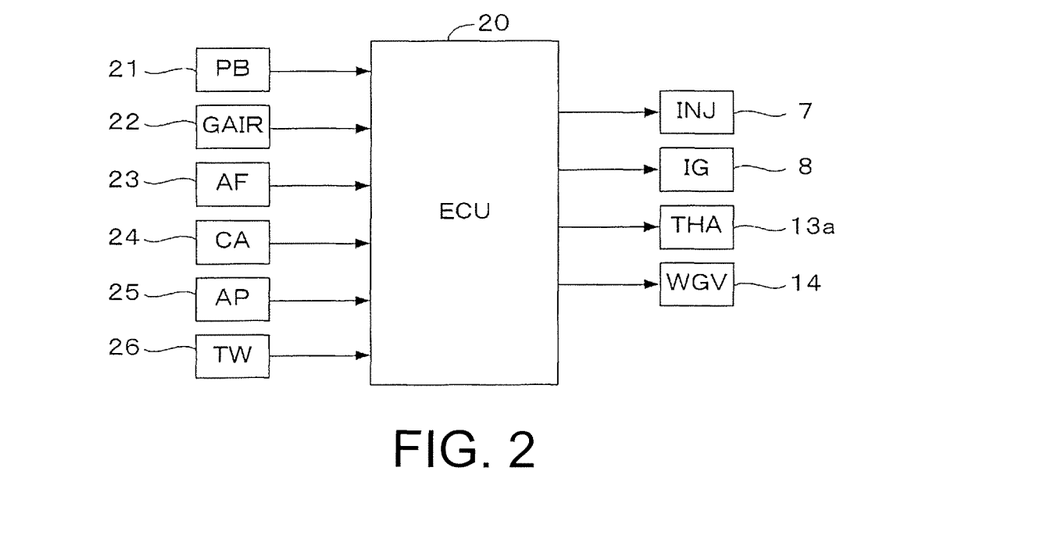
FIG. 2 is a block diagram showing the configuration of a control system for performing control over the internal combustion engine shown in FIG. 1.

FIG. 2 is a block diagram showing the configuration of a control system that controls the engine 1. In addition to the intake pressure sensor 21, the intake air amount sensor 22, and the air-fuel ratio sensor 23 described above, a crank angle sensor 24 that detects a rotation angle CA of a crankshaft of the engine 1, an accelerator sensor 25 that detects a depression amount (referred to as "accelerator pedal operation amount" hereinafter) AP of an accelerator pedal (not shown) depressed by a driver of the vehicle driven by the engine 1, a cooling water temperature sensor 26 that detects an engine cooling water temperature TW, and other sensors (not shown) are connected to an electronic control unit (referred to as "ECU" hereinafter) 20, and detection signals of these sensors are supplied to the ECU 20. The accelerator pedal operation amount AP is a parameter indicating a request of the vehicle driver. The injector 7, the spark plug 8, the throttle actuator 13a, and the WG valve 14 are connected to an output side of the ECU 20. Control of various timings, such as fuel injection timing and ignition timing, is performed and an engine speed NE is calculated based on a detection output of the crank angle sensor 24.

The ECU 20 has a known configuration that includes a CPU, a memory, an input/output circuit, etc., and performs fuel injection control by the injector 7, ignition control by the spark plug 8, turbine driving control (supercharging control) by the WG valve 14, and intake air amount control by the throttle valve 13 according to an engine operation state (mainly the engine speed NE and a required torque TRQCMD). The required torque TRQCMD is calculated mainly according to the accelerator pedal operation amount AP and is calculated so as to increase as the accelerator pedal operation amount AP increases. In addition, a target intake air amount GAIRCMD is calculated according to a target air-fuel ratio AFCMD and the required torque TRQCMD and is calculated so as to be substantially proportional to the target air-fuel ratio AFCMD and the required torque TRQCMD. The intake air amount control is performed by the throttle valve 13 so that the detected intake air amount GAIR matches the target intake air amount GAIRCMD.

A fuel injection amount (mass) GINJ of the injector 7 is controlled by correcting a basic fuel amount GINJB, which is calculated by using the intake air amount GAIR, by using a target equivalence ratio KCMD and an air-fuel ratio correction coefficient KAF corresponding to the air-fuel ratio AF detected by the air-fuel ratio sensor 23. The air-fuel ratio correction coefficient KAF is calculated so that the detected air-fuel ratio AF (an equivalence ratio KACT) matches the target air-fuel ratio AFCMD (the target equivalence ratio KCMD). The equivalence ratio is proportional to a reciprocal of the air-fuel ratio AF and is a parameter that takes "1.0" when the air-fuel ratio AF is equal to a theoretical air-fuel ratio (14.7). The fuel injection amount GINJ is converted into a valve opening time TOUT of the injector 7 according to a fuel pressure PF, the density of the fuel, etc., by using a known method, and is controlled so that the amount of the fuel supplied into the combustion chamber per cycle is the fuel injection amount GINJ. The fuel injection amount GINJ is calculated by the following equation (1).

$$GINJ = GINJB \times KCMD \times KAF \times KTOTAL \quad (1)$$

GINJB is the basic fuel amount that is calculated according to the intake air amount GAIR so that the air-fuel ratio of the air-fuel mixture becomes the theoretical air-fuel ratio AFST (=14.7), and the target equivalence ratio KCMD is represented by the following equation (2) using the target air-fuel ratio AFCMD. KTOTAL is a product of correction coefficients (e.g., a correction coefficient corresponding to the engine cooling water temperature, etc.) other than the target equivalence ratio KCMD and the air-fuel ratio correction coefficient KAF.

$$KCMD = AFST/AFCMD \quad (2)$$

Figure 3A:
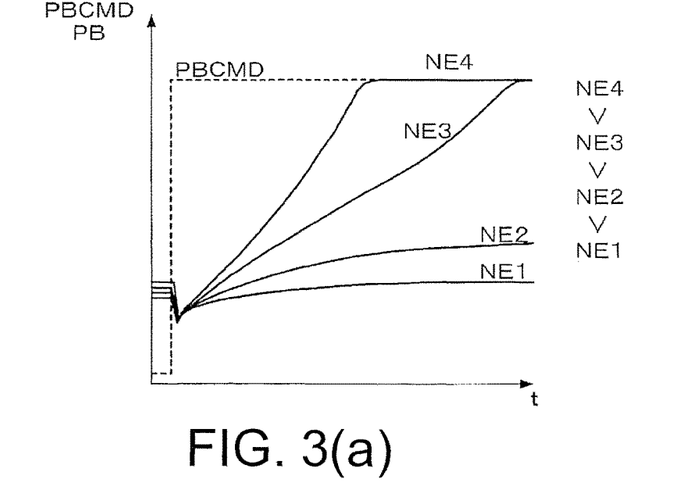
FIG. 3(a) and FIG. 3(b) are diagrams for illustrating the problem when supercharging is performed during a lean operation.
Figure 3B:
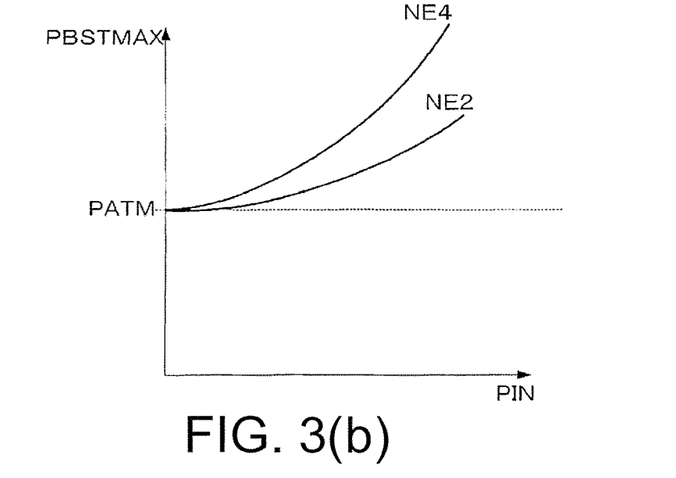

FIG. 3(a) and FIG. 3(b) are diagrams for illustrating a problem when supercharging is performed by the turbocharger 12 during a lean operation, in which the target air-fuel ratio AFCMD is set to a predetermined lean air-fuel ratio AFLN (e.g., about "30") on a lean side of the theoretical air-fuel ratio. The predetermined lean air-fuel ratio AFLN is a value that can make the NOx concentration in the exhaust gas (feed gas) discharged from the combustion chamber lower than an allowable limit and achieve stable combustion, and is set to "30," for example.

FIG. 3(a) shows a response characteristic (rising characteristic) of the supercharging pressure PB when a target intake air pressure PBCMD is increased stepwise during the lean operation while FIG. 3(b) shows the relationship between an intake air pressure (compressor upstream side pressure) PIN and a steadily achievable maximum supercharging pressure (steady maximum supercharging pressure) PBSTMAX. The "steady lean operation" in this specification refers to an operation that the target air-fuel ratio AFCMD is set to the predetermined lean air-fuel ratio AFLN.

The four curves shown in FIG. 3(a) show transition of the supercharging pressure PB and correspond to the cases where the engine speed NE is NE1 to NE4 respectively (NE4>NE3>NE2>NE1, and NE1 is about 1500 rpm and NE4 is about 3000 rpm). Further, the two curves shown in FIG. 3(b) respectively correspond to the cases where the engine speed NE is NE4 and NE2 respectively, and PATM is an atmospheric pressure. As clearly shown by these figures, when the engine speed NE is low, the steady maximum supercharging pressure PBSTMAX decreases and a step response delay of the supercharging pressure PB increases. Therefore, if an acceleration request is made in the steady operation state where the engine speed NE is relatively low, the increase of the intake air amount GAIR is delayed and causes the responsiveness of an actual output torque TRQA at the time of acceleration to deteriorate.

Thus, in the present embodiment, an air-fuel ratio control is performed to improve the response characteristic of the actual output torque TRQA when the accelerator pedal is depressed in a state where the vehicle driven by the engine 1 is cruise traveling, for example, at a vehicle speed of 80 km/h with the engine speed NE=NE2 (e.g., 2000 rpm) or so.

Figure 4:
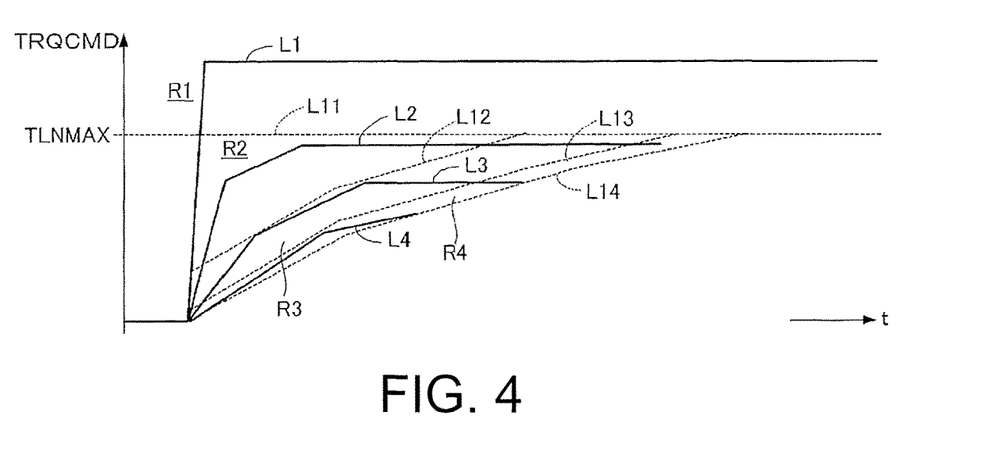
FIG. 4 is a time chart showing transition of a required torque (TRQCMD) when the driver makes an acceleration request during the lean operation.

FIG. 4 is a time chart showing transition of the required torque TRQCMD when the driver makes the acceleration request during the lean operation, in which the solid lines L1 to L4 indicate an increase characteristic of the required torque TRQCMD corresponding to the acceleration request (depression of the accelerator pedal) of the driver while the broken line L11 indicates a maximum torque (lean supercharging maximum torque) TLNMAX that is achievable through supercharging performed by the turbocharger 12 during the lean operation. Accordingly, as indicated by the solid line L1, when the required torque TRQCMD exceeds the broken line L11 (when entering a region R1), it is not possible to match the actual output torque TRQA with the required torque TRQCMD in the lean operation, and thus it shills to a stoichiometric operation, in which the target air-fuel ratio AFCMD is set to the theoretical air-fuel ratio AFST.

The broken line L14 indicates a torque increase characteristic (referred to as "lean supercharging response characteristic" hereinafter) that is achievable while the predetermined lean air-fuel ratio AFLN is maintained. The broken line L13 indicates a torque increase characteristic obtained by adding a predetermined torque increment to the lean supercharging response characteristic indicated by the broken line L14, and the predetermined torque increment corresponds to a torque increase characteristic that, even if there is a response delay in the actual torque increase characteristic, the response delay is assumed to be acceptable to the vehicle user. The broken line L12 indicates the maximum torque that is achievable by performing an enrichment (referred to as "lean range enrichment" hereinafter), which is to reduce the target air-fuel ratio AFCMD to a value in a range smaller than the predetermined lean air-fuel ratio AFLN and larger than the theoretical air-fuel ratio AFST, more specifically, to a limit air-fuel ratio AFLMT (which will be described later).

Even if the required torque TRQCMD is equal to or smaller than the lean supercharging maximum torque TLN-MAX, as indicated by the solid line L2, when it exceeds the broken line L12 (when entering a region R2), it is necessary to shift to the stoichiometric operation. In addition, when the required torque TRQCMD remains in a region R3 between the broken lines L12 and L13, as indicated by the solid line L3, the lean range enrichment is performed to improve the rising characteristic of the actual output torque TRQA, and when it remains in a region R4 between the broken lines L13 and L14, as indicated by the solid line L4, the lean range enrichment is not performed to maintain the target air-fuel ratio AFCMD at the predetermined lean air-fuel ratio AFLN.

Figure 5:
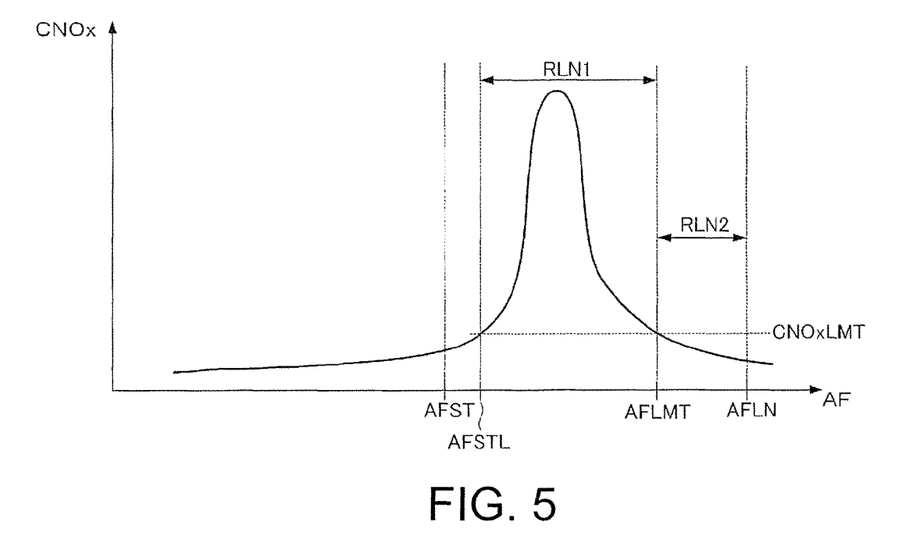
FIG. 5 is a diagram showing the relationship between an air-fuel ratio (AF) of an air-fuel mixture that burns in a combustion chamber and a NOx concentration (CNOx) in an exhaust gas on the downstream side of an exhaust gas purification catalyst.

FIG. 5 is a diagram showing the relationship between the air-fuel ratio AF of the air-fuel mixture that burns in the combustion chamber and the NOx concentration CNOx in the exhaust gas on the downstream side of the exhaust gas purification catalyst 15. In order to keep the NOx concentration CNOx below an allowable limit CNOxLMT, it is necessary to avoid setting the target air-fuel ratio AFCMD to a first lean air-fuel ratio range RLN1 that is from an air-fuel ratio AFSTL (e.g., "16"), which is slightly on the lean side of the theoretical air-fuel ratio AFST, to the limit air-fuel ratio AFLMT (e.g., "25"), and the aforementioned lean range enrichment needs to be performed within a second lean air-fuel ratio range RLN2.

Figures 6A, 6B, 6C:
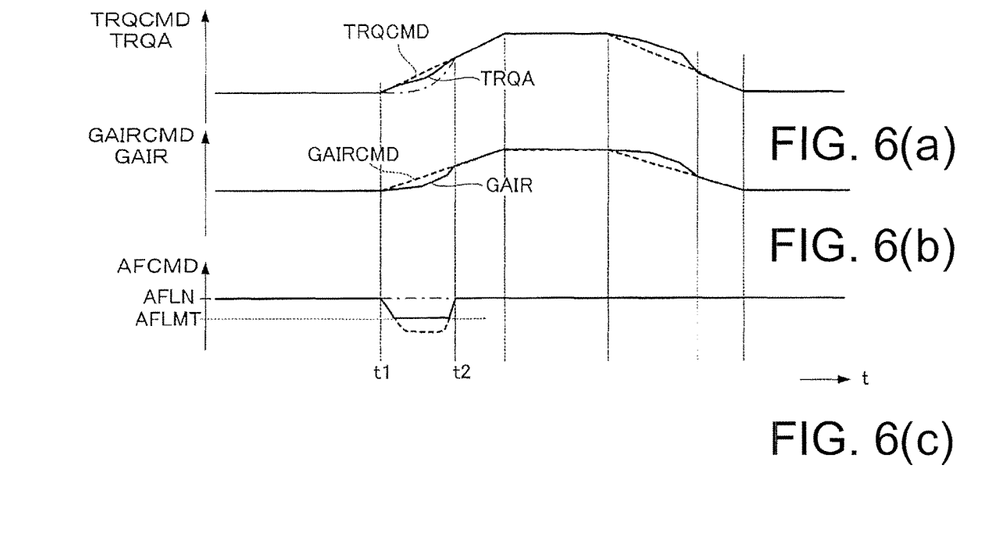
FIG. 6(a) to FIG. 6(c) are time charts for illustrating air-fuel ratio control of the present embodiment.

FIG. 6(a) to FIG. 6(c) are time charts for illustrating the air-fuel ratio control of the present embodiment, and respectively show the required torque TRQCMD (broken line) and the actual output torque TRQA (solid line), the target intake air amount GAIRCMD (broken line) and the actual intake air amount GAIR (solid line), and transition of the target air-fuel ratio AFCMD (solid line). In FIG. 6(a) and FIG. 6(b), the portion where the solid line and the broken line overlap is depicted by the solid line only.

FIG. 6(a) to FIG. 6(c) illustrate an operation example that, at a time t1 in the lean supercharging operation, in which the target air-fuel ratio AFCMD is set to the predetermined lean air-fuel ratio AFLN and supercharging is being performed by the turbocharger 12, the accelerator pedal is depressed to start increasing the required torque TRQCMD (the broken line in FIG. 6(a)).

As the required torque TRQCMD increases, the target intake air amount GAIRCMD also increases. However, due to the supercharging response delay, the actual intake air amount GAIR increases later than the target intake air amount GAIRCMD as indicated by the solid line. At this time, if the target air-fuel ratio AFCMD is maintained at the predetermined lean air-fuel ratio AFLN as indicated by the one-dot chain line in FIG. 6(c), the actual output torque TRQA follows the required torque TRQCMD with a delay in the same manner as the delay of increase of the intake air amount GAIR as indicated by the one-dot chain line in FIG. 6(a). After a time t2, the intake air amount GAIR reaches a state that matches the target intake air amount GAIRCMD.

Therefore, in the present embodiment, the air-fuel ratio control is performed, in which an air-fuel ratio reduction control for reducing the target air-fuel ratio AFCMD as indicated by the solid line is performed, so as to bring the actual output torque TRQA close to the required torque TRQCMD as indicated by the solid line. However, if it is set to a value smaller than the limit air-fuel ratio AFLMT, the feed NOx amount increases and the NOx concentration CNOx on the downstream side of the exhaust gas purification catalyst increases. Thus, the target air-fuel ratio AFCMD is set not to be smaller than the limit air-fuel ratio AFLMT. Accordingly, when the driver makes the acceleration request during the lean supercharging operation, the NOx concentration CNOx can be kept equal to or lower than the allowable limit CNOxLMT and the delay (acceleration response delay) of increase of the actual output torque TRQA can be improved.

Figure 7:
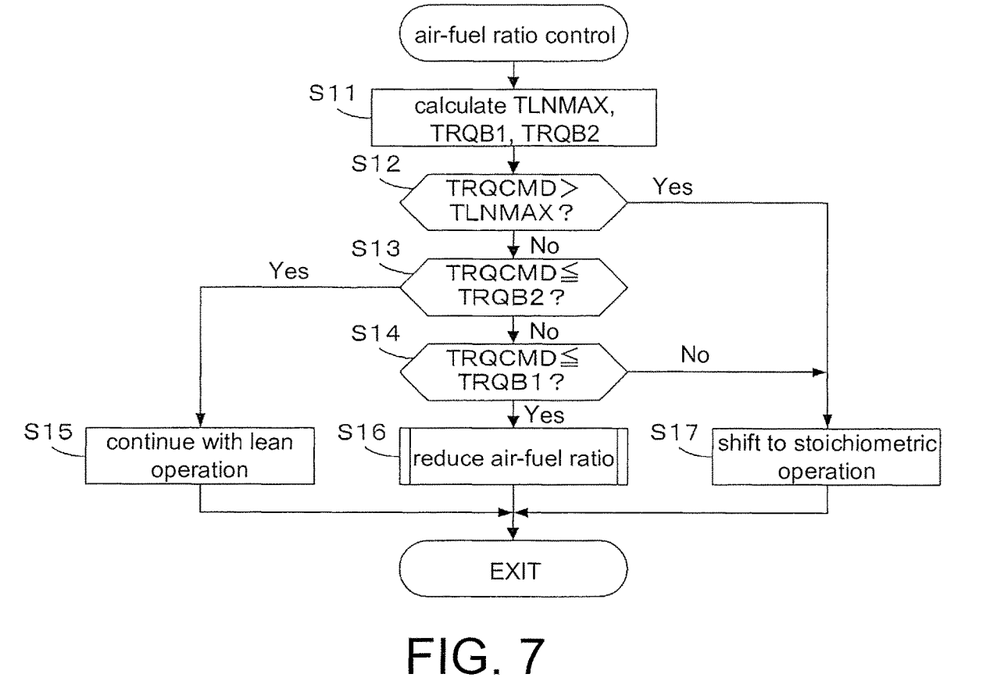
FIG. 7 is a flow chart of the air-fuel ratio control that is performed when an acceleration request is made during the lean operation.

FIG. 7 is a flow chart of an air-fuel ratio control process that is performed when the aforementioned acceleration request is made during the lean operation. This process is preformed per fixed time TCAL. The process as shown in FIG. 7 is performed only when the required torque TRQCMD is increasing.

In Step S11, the lean supercharging maximum torque TLNMAX is calculated according to the engine speed NE, and a first boundary torque TRQB1 corresponding to the broken line L12 in FIG. 4 and a second boundary torque TRQB2 corresponding to the broken line L13 are calculated according to the engine speed NE and an elapsed time TACCL after a start time point of the process of FIG. 7. More specifically, a lean supercharging response torque TRQLN is calculated by searching a map, in which the lean supercharging response characteristic corresponding to the broken line L14 shown in FIG. 4 has been preset, according to the engine speed NE and the elapsed time TACCL, and the first boundary torque TRQB1 is calculated by adding an enrichment torque increment DTRQ1, which can be increased by performing the lean range enrichment, to the lean supercharging response torque TRQLN, and furthermore the second boundary torque TRQB2 is calculated by adding a predetermined torque increment DTRQ2, as described with reference to FIG. 4, to the lean supercharging response torque TRQLN. The enrichment torque increment DTRQ1 is calculated according to the lean supercharging response torque TRQLN. The lean supercharging maximum torque TLNMAX and the lean supercharging response torque TRQLN are set to increase as the engine speed NE gets higher as described above.

In Step S12, whether the required torque TRQCMD is larger than the lean supercharging maximum torque TLNMAX is determined, and if the answer is affirmative (YES), the operation shifts to the stoichiometric operation (Step S17). If the answer to Step S12 is negative (NO), whether the required torque TRQCMD is equal to or smaller than the second boundary torque TRQB2 is determined (Step S13). If the answer is affirmative (YES), the target air-fuel ratio AFCMD is maintained at the predetermined lean air-fuel ratio AFLN to continue with the lean operation (Step S15).

If the answer to Step S13 is negative (NO), whether the required torque TRQCMD is equal to or smaller than the first boundary torque TRQB1 is determined (Step S14). If the answer is affirmative (YES), that is, if the required torque TRQCMD is a value between the broken lines L12 and L13 in FIG. 4, the air-fuel ratio reduction control as shown in FIG. 7 is performed and the aforementioned lean range enrichment is performed (Step S16). If the answer to Step S14 is negative (NO), the operation shifts to the stoichiometric operation (Step S17).

Figure 8:
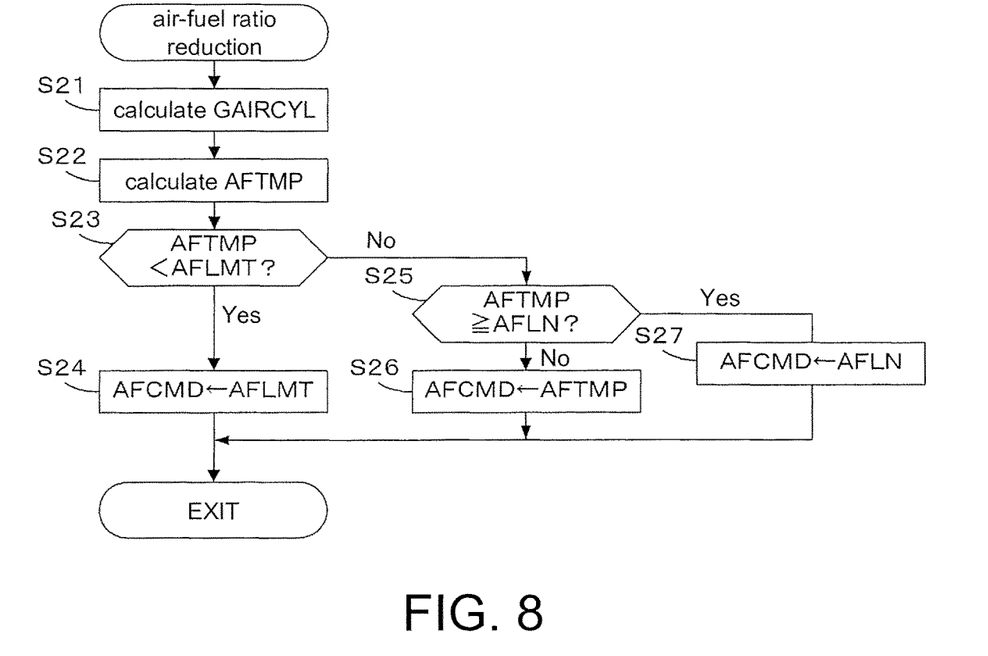
FIG. 8 is a flow chart of the air-fuel ratio reduction control that is performed in the process of FIG. 7.

FIG. 8 is a flow chart of the air-fuel ratio reduction control performed in Step S17 of FIG. 7. In Step S21, a cylinder intake air amount GAIRCYL is calculated by using the detected intake air amount GAIR. The cylinder intake air amount GAIRCYL may be calculated by a known method (for example, Japanese Patent Publication No. 5118247).

In Step S22, a temporary target air-fuel ratio AFTMP is calculated by applying the required torque TRQCMD and the cylinder intake air amount GAIRCYL to the following equation (3).

$$AFTMP=(GAIRCYL/TRQCMD) \times KTRQ \qquad (3)$$

Here, KTRQ is a torque conversion coefficient for converting the fuel injection amount GINJ into the output torque of the engine 1, and is calculated through map searching according to the engine speed NE and a previous value of the temporary target air-fuel ratio AFTMP. An initial value of the temporary target air-fuel ratio AFTMP is the predetermined lean air-fuel ratio AFLN. The equation (3) is an arithmetic expression based on a premise that the ignition timing is set to an optimal ignition timing when the torque is maximized.

With use of the equation (3), the temporary target air-fuel ratio AFTMP is reduced as the required torque TRQCMD increases, and the temporary target air-fuel ratio AFTMP for achieving the required torque TRQCMD is obtained.

In Step S23, whether the temporary target air-fuel ratio AFTMP is smaller than the limit air-fuel ratio AFLMT is determined, and if the answer is affirmative (YES), the target air-fuel ratio AFCMD is set to the limit air-fuel ratio AFLMT (Step S24). On the other hand, if the answer to Step S23 is negative (NO), whether the temporary target air-fuel ratio AFTMP is equal to or larger than the predetermined lean air-fuel ratio AFLN is determined (Step S25). If the answer is negative (NO), the target air-fuel ratio AFCMD is set to the temporary target air-fuel ratio AFTMP (Step S26). If the answer to Step S25 is affirmative (YES), the target air-fuel ratio AFCMD is set to the predetermined lean air-fuel ratio AFLN (Step S27).

By performing the processes of FIG. 7 and FIG. 8, the target air-fuel ratio AFCMD is set as indicated by the solid line in FIG. 6(c), and the NOx concentration CNOx can be kept equal to or lower than the allowable limit CNOxLMT and the response delay of the actual output torque TRQA caused by the delayed rise of the intake air amount GAIR can be improved.

As described above, in the present embodiment, the target air-fuel ratio AFCMD is set according to the accelerator pedal operation performed by the driver of the vehicle, and fuel is supplied to the engine 1 by the injector 7 based on the target air-fuel ratio AFCMD. When the driver depresses the accelerator pedal to make the acceleration request during execution of the lean operation, in which the target air-fuel ratio AFCMD is set to the predetermined lean air-fuel ratio AFLN (including the situation where supercharging has been performed by the turbocharger 12), the air-fuel ratio reduction control that reduces the target air-fuel ratio AFCMD according to the required torque TRQCMD is performed. In the air-fuel ratio reduction control, when the temporary target air-fuel ratio AFTMP calculated according to the required torque TRQCMD is smaller than the limit air-fuel ratio AFLMT, the target air-fuel ratio AFCMD is corrected to the limit air-fuel ratio AFLMT, and the limit air-fuel ratio AFLMT is set to a value that is smaller than the predetermined lean air-fuel ratio AFLN set in the steady state of the lean operation and larger than the theoretical air-fuel ratio AFST. As shown in FIG. 5, if the target air-fuel ratio AFCMD is set to a lean air-fuel ratio within the first lean air-fuel ratio range RLN1 that is from the value AFSTL, which is slightly on the lean side of the theoretical air-fuel ratio AFST, to the limit air-fuel ratio AFLMT, the feed NOx amount increases and the NOx concentration CNOx on the downstream side of the exhaust gas purification catalyst 15 also increases. Therefore, by setting the limit air-fuel ratio AFLMT to about 25, for example, the NOx emission amount can be suppressed and the acceleration responsiveness can be improved at the time of acceleration in the lean operation.

In addition, as shown in FIG. 5, within the range where the NOx concentration CNOx contained in the exhaust gas on the downstream side of the exhaust gas purification catalyst 15 increases corresponding to the decrease of the air-fuel ratio AF, the limit air-fuel ratio AFLMT is set to a minimum value, at which the concentration is equal to or lower than the allowable limit CNOxLMT. Thus, it is possible to avoid setting the target air-fuel ratio AFCMD to a value in the first lean air-fuel ratio range RLN1, and the NOx concentration CNOx can be kept equal to or lower than the allowable limit CNOxLMT. Since the exhaust gas purification catalyst 15 has no purification ability in the range where the NOx concentration CNOx increases corresponding to the decrease of the air-fuel ratio (the range on the lean side of the air-fuel ratio at which the NOx concentration becomes maximum as shown in FIG. 5), the NOx concentration CNOx is the same as the NOx concentration on the upstream side of the exhaust gas purification catalyst 15, that is, the NOx concentration in the exhaust gas discharged from the combustion chamber of the engine 1. Accordingly, the limit air-fuel ratio AFLMT can be defined as the minimum air-fuel ratio, at which the NOx concentration in the exhaust gas discharged from the combustion chamber is equal to or lower than the allowable limit CNOxLMT.

Furthermore, when the increase characteristic of the required torque TRQCMD is the characteristic indicated by the solid line L1 or L2 in FIG. 4, that is, when it is determined that the actual output torque TRQA cannot match the required torque TRQCMD even with execution of the air-fuel ratio reduction control (when the required torque TRQCMD has a relatively large increase speed and/or increase amount and the required torque TRQCMD cannot be achieved through the air-fuel ratio reduction control), the target air-fuel ratio AFCMD is changed to the theoretical air-fuel ratio AFST. Thus, it is possible to avoid the air-fuel ratio range where the NOx emission amount increases and make the actual output torque TRQA match the required torque TRQCMD.

In the present embodiment, the ECU 20 and the accelerator sensor 25 constitute the required torque setting unit and the target air-fuel ratio setting unit, and the ECU 20 and the injector 7 constitute the fuel supply unit.

Second Embodiment

In the present embodiment, the invention is applied to a vehicle that includes the engine 1 and an electric motor as the motor. The second embodiment is the same as the first embodiment except for the following points.

Figure 9:
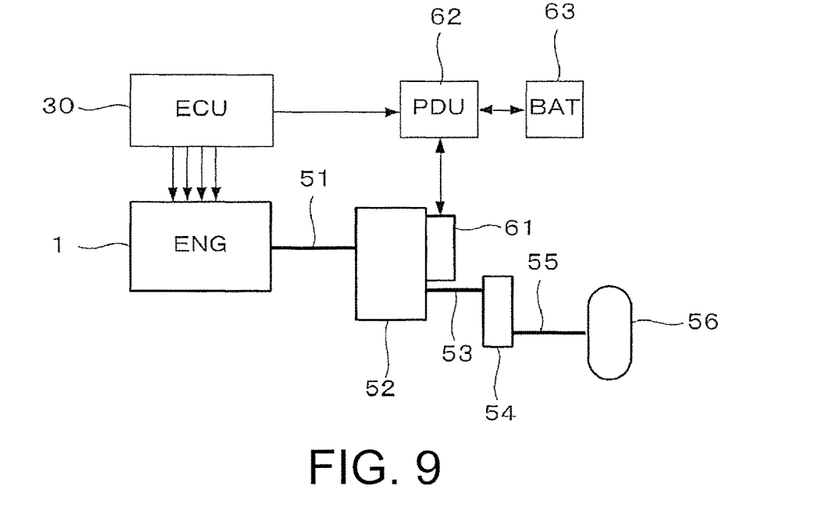
FIG. 9 is a diagram schematically showing the overall configuration of a driving device of a vehicle that includes an internal combustion engine and an electric motor as the motor.

FIG. 9 schematically shows the overall configuration of a vehicle driving device. The vehicle driving device includes the aforementioned engine 1, an electric motor (referred to as "motor" hereinafter) 61 that functions as the motor and generator, and a transmission 52 for transmitting a driving force of the engine 1 and/or the motor 61. In the vehicle driving device, a crankshaft 51 of the engine 1 is connected to the transmission 52 and is configured to drive a drive wheel 56 via an output shaft 53 of the transmission 52, a differential gear mechanism 54, and a drive shaft 55. The motor 61 is connected to a power drive unit (referred to as "PDU" hereinafter) 62, and the PDU 62 is connected to a high-voltage battery 63. The transmission 52 is a twin clutch transmission, which includes an odd-numbered stage clutch and an even-numbered stage clutch respectively corresponding to an odd-numbered gear stage and an even-numbered gear stage. The vehicle driving device is capable of performing an engine mode traveling in which only the engine 1 is operated as the motor, and a hybrid mode traveling in which both the engine 1 and the motor 61 are operated as the motor. Further, the vehicle driving device is configured to be capable of performing an electric mode traveling, in which only the motor 61 is operated as the motor, by setting the two clutches of the transmission 52 to a released state.

When the motor 61 is driven by a positive drive torque, that is, when the motor 61 is driven by electric power outputted from the high-voltage battery 63, the electric power outputted from the high-voltage battery 63 is supplied to the motor 61 via the PDU 62. Moreover, when the motor 61 is driven by a negative drive torque, that is, when the motor 61 is regeneratively operated, electric power generated by the motor 61 is supplied to the high-voltage battery 63 via the PDU 62 to charge the high-voltage battery 63. The PDU 62 is connected to an ECU 30, and controls the operation of the motor 61 and controls charging and discharging of the high-voltage battery 63. In addition to the function of the ECU 20 described in the first embodiment, the ECU 30 controls the operation of the motor 61. The ECU 30 is configured by connecting the ECU 20 of the first embodiment and a motor control ECU via a communication bus, for example.

Figure 10:
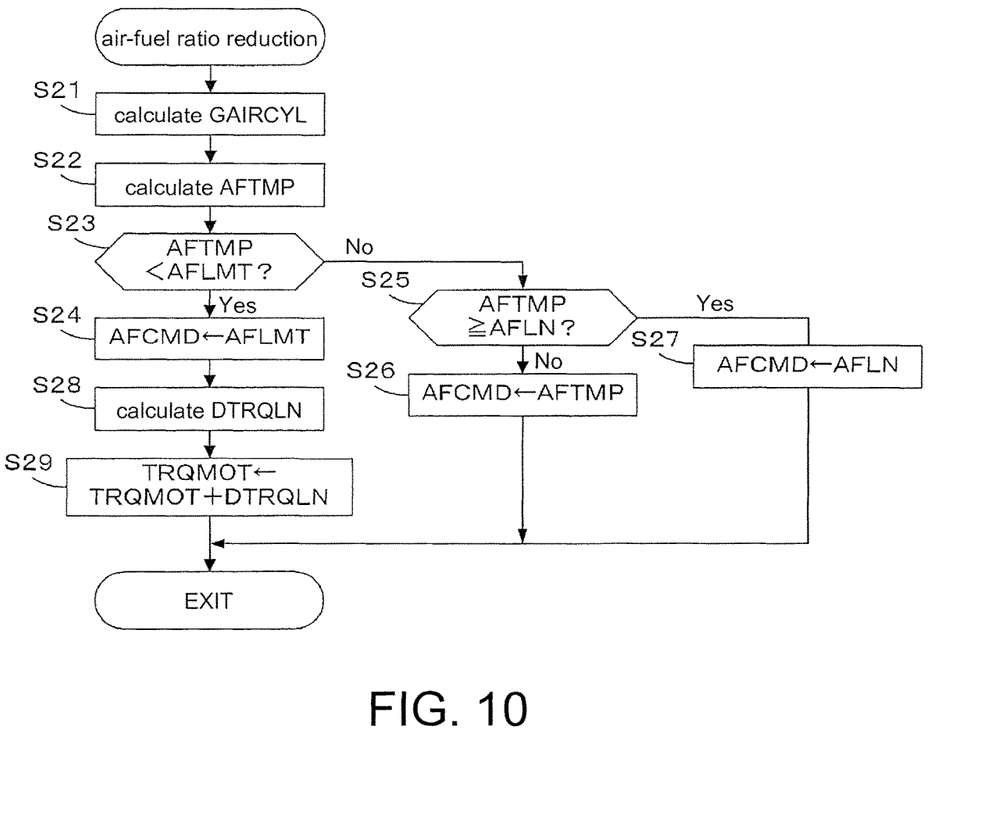
FIG. 10 is a flow chart of air-fuel ratio reduction control (the second embodiment).

FIG. 10 is a flow chart of air-fuel ratio reduction control according to the present embodiment. The control shown in FIG. 10 is performed by adding Step S28 and Step S29 to the control shown in FIG. 8.

If the answer to Step S23 is affirmative (YES), the target air-fuel ratio AFCMD is set to the limit air-fuel ratio AFLMT (Step S24). Therefore, as shown in FIG. 6(a), the actual output torque TRQA is slightly smaller than the required torque TRQCMD. In the present embodiment, a torque difference DTRQLN that is insufficient at that time is compensated by driving the motor 61.

That is, in Step S28, the torque difference DTRQLN is calculated by the following equation (4). TRQAE in the equation (4) is an estimated output torque and is calculated by the following equation (5).

$$DTRQLN = TRQCMD - TRQAE \quad (4)$$

$$TRQAE = (GAIRCYL/AFLMT) \times KTRQ \quad (5)$$

In Step S29, a motor required torque TRQMOT is updated by the following equation (6). When the motor 61 is not driven, the TRQMOT on the right side of the equation (6) is "0" and the motor required torque TRQMOT is set to the torque difference DTRQLN.

$$TRQMOT = TRQMOT + DTRQLN \quad (6)$$

According to the present embodiment, when the target air-fuel ratio AFCMD has been corrected to the limit air-fuel ratio AFLMT, the motor 61 is controlled to add the torque DTRQLN, which corresponds to the difference between the actual output torque TRQA and the required torque TRQCMD, for output. Thus, it is possible to suppress the NOx concentration CNOx in the exhaust gas as well as compensate the insufficiency of the actual output torque TRQA of the engine 1 with the motor output torque.

In the present embodiment, the ECU 30 and the accelerator sensor 25 constitute the required torque setting unit and the target air-fuel ratio setting unit, the ECU 30 and the injector 7 constitute the fuel supply unit, and the ECU 30 and the PDU 62 constitute the electric motor control unit.

Nevertheless, the invention should not be construed as being limited to the embodiments described above and may be modified in various ways. For instance, the above embodiments illustrate an example of applying the invention to a control device of a vehicle that includes an internal combustion engine as the motor, and the internal combustion engine has a direct injection injector for injecting fuel into the combustion chamber. However, the invention may also be applied to a control device of a vehicle including an internal combustion engine, which has a port injection injector for injecting fuel to an intake port, or an internal combustion engine, which has both the direct injection injector and the port injection injector, as the motor.

FIG. 6(a) to FIG. 6(c) illustrate an operation example that the supercharging is performed by the turbocharger 12 before the time t 1. However, the invention may also be applied to a case where the acceleration request is made during the steady lean operation without supercharging, and supercharging is started and the intake air amount is increased.

In addition, in Step S11 of the process shown in FIG. 7 (and FIG. 10), the lean supercharging response torque TRQLN indicated by the broken line L14 in FIG. 4 is calculated by searching a map that is preset according to the engine speed NE and the elapsed time TACCL. However, the invention is not limited thereto. For example, an exhaust gas temperature TEX may be detected, and the lean supercharging response torque TRQLN may be calculated according to the detected intake air amount GAIR and the exhaust gas temperature TEX. More specifically, the lean supercharging response torque TRQLN may be calculated by calculating a parameter indicative of the exhaust gas energy according to the detected intake air amount GAIR and the exhaust gas temperature TEX, estimating a supercharging pressure rising characteristic of the turbocharger 12 according to the exhaust energy parameter, obtaining the intake air amount increase characteristic from the estimated supercharging pressure rising characteristic, and converting the intake air amount increase characteristic into the output torque increase characteristic. Alternatively, the lean supercharging response torque TRQLN may be calculated by detecting the supercharging pressure PB and converting the increase characteristic of the detected supercharging pressure PB into the output torque increase characteristic.

Also, calculation of the temporary target air-fuel ratio AFTMP in the air-fuel ratio reduction control may be performed simply by the following equation (7).

$$AFTMP = AFLN \times GAIR/GAIRCMD \quad (7)$$

What is claimed is:
1. A control device of a vehicle that is drivable by an internal combustion engine comprising a supercharger, wherein the internal combustion engine is capable of executing a lean operation, in which an air-fuel ratio of an air-fuel mixture that burns in the internal combustion engine is set to a lean side of a theoretical air-fuel ratio, and a lean supercharging operation, in which supercharging is performed by the supercharger during the lean operation, the control device of the vehicle comprising:

a required torque setting unit setting a required torque of the internal combustion engine based on a request of a driver;

a target air-fuel ratio setting unit setting a target air-fuel ratio of the air-fuel mixture based on the required torque; and     a fuel supply unit supplying a fuel to the internal combustion engine based on the target air-fuel ratio,     wherein when the driver makes an acceleration request during execution of the lean operation, the target air-fuel ratio setting unit executes an air-fuel ratio reduction control to reduce the target air-fuel ratio according to the acceleration request, and     when the target air-fuel ratio is smaller than a limit air-fuel ratio in the air-fuel ratio reduction control, the target air-fuel ratio setting unit corrects the target air-fuel ratio to the limit air-fuel ratio,     wherein the limit air-fuel ratio is set to a value smaller than a steady lean operation air-fuel ratio set in a steady state of the lean operation and larger than the theoretical air-fuel ratio.

2. The control device of the vehicle according to claim 1, wherein the limit air-fuel ratio is set to a minimum value, at which an NOx concentration contained in an exhaust gas discharged from a combustion chamber of the internal combustion engine is equal to or lower than an allowable limit.

3. The control device of the vehicle according to claim 1, wherein the target air-fuel ratio setting unit changes the target air-fuel ratio to the theoretical air-fuel ratio when determining that an output torque of the internal combustion engine does not match the required torque even with execution of the air-fuel ratio reduction control.

4. The control device of the vehicle according to claim 1, wherein the vehicle is drivable by the internal combustion engine and an electric motor, and further comprises an electric motor control unit that controls the electric motor,     wherein the electric motor control unit controls the electric motor so as to increase an output torque of the electric motor by a difference between the output torque of the internal combustion engine and the required torque when the target air-fuel ratio has been corrected to the limit air-fuel ratio.

5. The control device of the vehicle according to claim 2, wherein the target air-fuel ratio setting unit changes the target air-fuel ratio to the theoretical air-fuel ratio when determining that an output torque of the internal combustion engine does not match the required torque even with execution of the air-fuel ratio reduction control.

6. The control device of the vehicle according to claim 2, wherein the vehicle is drivable by the internal combustion engine and an electric motor, and further comprises an electric motor control unit that controls the electric motor,     wherein the electric motor control unit controls the electric motor so as to increase an output torque of the electric motor by a difference between the output torque of the internal combustion engine and the required torque when the target air-fuel ratio has been corrected to the limit air-fuel ratio.

7. The control device of the vehicle according to claim 3, wherein the vehicle is drivable by the internal combustion engine and an electric motor, and further comprises an electric motor control unit that controls the electric motor,     wherein the electric motor control unit controls the electric motor so as to increase an output torque of the electric motor by a difference between the output torque of the internal combustion engine and the required torque when the target air-fuel ratio has been corrected to the limit air-fuel ratio.

8. The control device of the vehicle according to claim 5, wherein the vehicle is drivable by the internal combustion engine and an electric motor, and further comprises an electric motor control unit that controls the electric motor,     wherein the electric motor control unit controls the electric motor so as to increase an output torque of the electric motor by a difference between the output torque of the internal combustion engine and the required torque when the target air-fuel ratio has been corrected to the limit air-fuel ratio.

\* \* \* \* \*